(12) United States Patent
Fiebiger et al.

(10) Patent No.: US 10,144,270 B2
(45) Date of Patent: Dec. 4, 2018

(54) VENTING DEVICE

(71) Applicant: Illinois Tool Works Inc., Glenview, IL (US)

(72) Inventors: Markus Fiebiger, Großniedeshein (DE); Eric Lang, Berling (FR); Andreas Senn, Neuhemsbach (DE)

(73) Assignee: Illinois Tool Works Inc., Glenview, IL (US)

( * ) Notice: Subject to any disclaimer, the term of this patent is extended or adjusted under 35 U.S.C. 154(b) by 101 days.

(21) Appl. No.: 14/969,085

(22) Filed: Dec. 15, 2015

(65) Prior Publication Data

US 2016/0193897 A1 Jul. 7, 2016

(30) Foreign Application Priority Data

Jan. 7, 2015 (DE) .......................... 10 2015 100 103

(51) Int. Cl.
*B60H 1/24* (2006.01)

(52) U.S. Cl.
CPC ............. *B60H 1/249* (2013.01); *B60H 1/246* (2013.01)

(58) Field of Classification Search
CPC ................................ B60H 1/249; B60H 1/248
USPC ............................................ 454/70, 75, 162
See application file for complete search history.

(56) References Cited

U.S. PATENT DOCUMENTS

| | | | |
|---|---|---|---|
| 4,972,765 A | 11/1990 | Dixon | |
| 5,373,867 A * | 12/1994 | Boyesen | F01L 3/205 123/73 V |
| 5,794,654 A * | 8/1998 | Marvonek | F01L 3/205 137/512.15 |
| 7,172,240 B1 * | 2/2007 | Kaufman | B60J 1/2002 296/152 |
| 2005/0081921 A1 | 4/2005 | Blake, III et al. | |
| 2008/0268763 A1 | 10/2008 | Dippel | |
| 2015/0030484 A1 * | 1/2015 | Rosa | F16K 15/144 417/559 |

FOREIGN PATENT DOCUMENTS

DE 102011016186 10/2012

* cited by examiner

*Primary Examiner* — Steven B McAllister
*Assistant Examiner* — Ko-Wei Lin
(74) *Attorney, Agent, or Firm* — Joseph M. Burscher; The Small Patent Law Group, LLC

(57) ABSTRACT

A venting device for a vehicle has a frame which is made from a hard plastic material and can be fixed in place in an opening of the vehicle. The frame has recesses and a non-return flap member made from a flexible material. The non-return flap member extends substantially over the entire frame and, in the region of the recesses, has cutouts which are configured in one piece with the non-return flap member. In a closed position, the cutouts are in surface contact with support surfaces surrounding the recesses and, in an open position, can be moved away from the support surfaces.

20 Claims, 3 Drawing Sheets

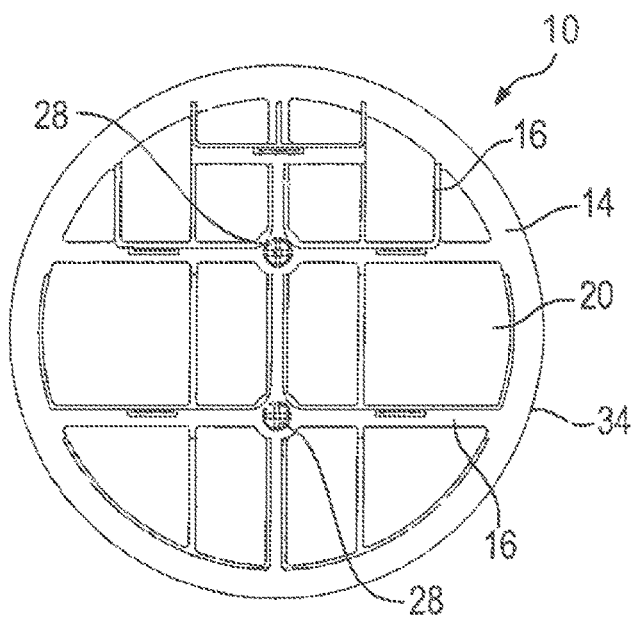
Fig. 1a
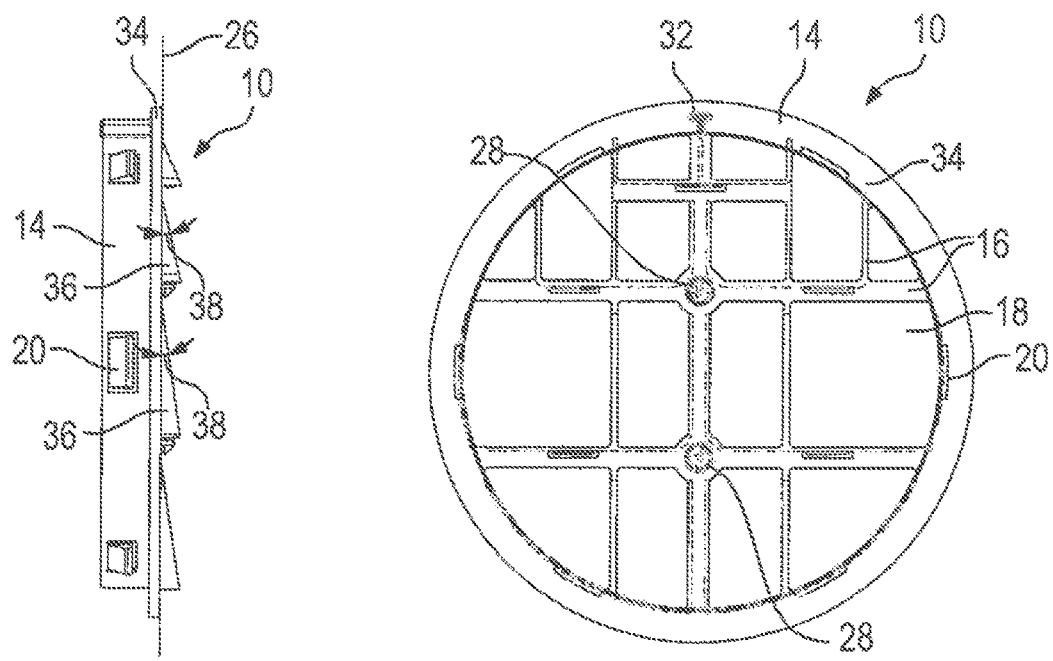
Fig. 1b
Fig. 1c

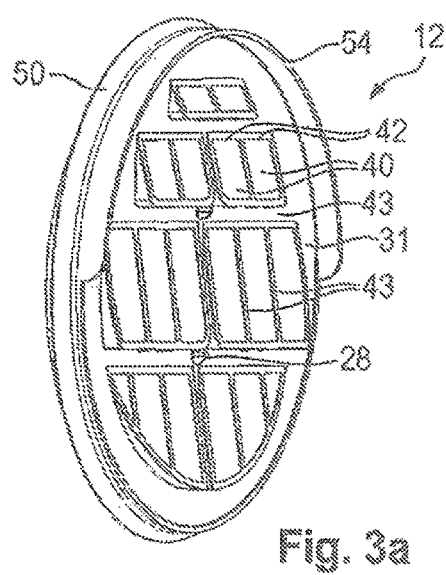
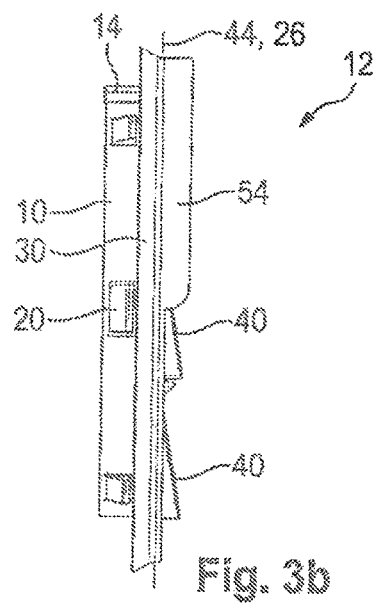
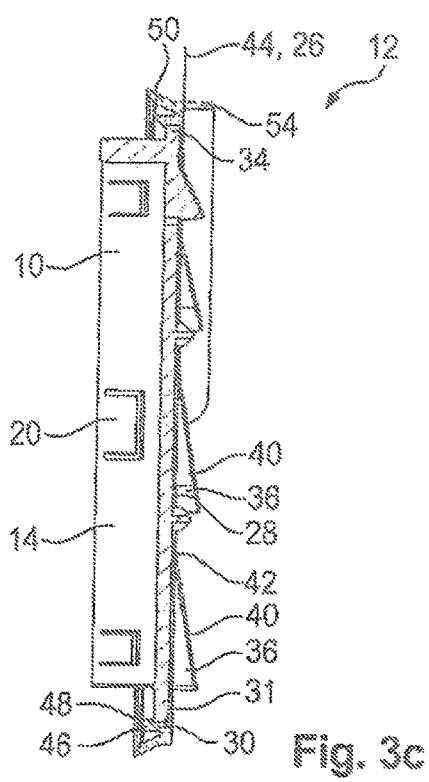
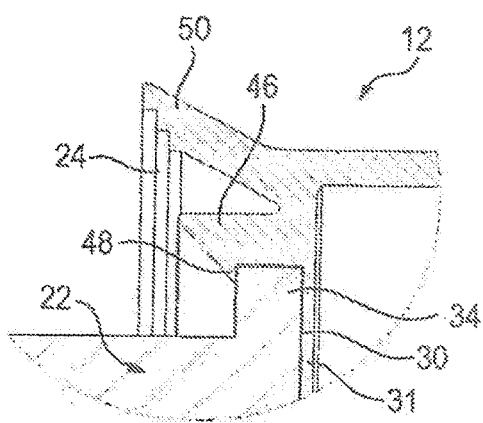

VENTING DEVICE

RELATED APPLICATION

This application claims priority from German Application No. 10 2015 100 103.9, filed Jan. 7, 2015, the subject matter of which is incorporated herein by reference in its entirety.

BACKGROUND OF THE INVENTION

The invention relates to a venting device for a vehicle.

Venting devices for vehicles are used for preventing or reducing an excess pressure in the passenger compartment. The venting devices include a frame which is made from a hard material, for example plastic, and can be fixed in place in an opening of the vehicle. The frame includes at least one recess which can be closed by means of a non-return flap. When there is an overpressure in the passenger compartment, for example by slamming a vehicle door, using the ventilation system or by a gas bag being activated, the non-return flap will open due to the overpressure in the vehicle interior, so that the overpressure can escape from the passenger compartment. In the opposite direction, the non-return flap rests against the frame to seal the opening in the vehicle, so that any ingress of moisture, exhaust gases or dirt into the vehicle interior is prevented.

Venting devices of this type are usually produced from two components. The frame is produced from a harder material component. The non-return flap or a non-return flap member is produced from a soft material, so that the non-return flaps can flexibly yield in case of an overpressure in the passenger compartment.

Attachment of the non-return flap member is effected either by producing the non-return flap member and the frame in a two-component injection molding process or by fixing the non-return flap member to the frame later, for example by means of a form-fitting connection or a substance-to-substance bond. Both manufacturing methods are very involved. It is known to arrange a separate non-return flap on each recess of the frame, which, however, further increases the assembly expenditure of such a venting device.

SUMMARY OF THE INVENTION

The object of the invention is to provide a venting device for a vehicle, which involves less assembly effort and allows a reliable sealing of the opening in the vehicle.

To achieve the object, provision is made for a venting device for a vehicle, having a frame which is made from a hard plastic material and can be fixed in place in an opening of the vehicle, the frame having recesses, and having a non-return flap member made from a flexible material, in particular a plastic material. The non-return flap member extends substantially over the entire frame and, in the region of the recesses, has cutouts which are configured in one piece with the non-return flap member and which, in a closed position, are in surface contact with support surfaces surrounding the recess and, in an open position, can be moved away from the support surfaces. According to the invention, rather than providing individual non-return flaps for each recess, use is made of a flat member made from a flexible material in which the non-return flaps, that is, the cutouts, are provided. This member is placed with surface contact on the entire surface of the frame and is supported by it. The large contact surface allows a very flexible connection of the frame with the non-return flap member. Fixing one member in place, namely, the non-return flap member, thus allows the assembly of a plurality of non-return flaps in one step, which are adapted to seal a plurality of recesses. The expenditure for manufacturing the venting device according to the invention is therefore considerably reduced.

In order to fix the non-return flap member to the frame as simply as possible, the non-return flap member is preferably provided with a surrounding holding edge which projects toward the frame substantially perpendicularly to the plane of the non-return flap member and completely engages around the frame in the peripheral direction. For mounting the non-return flap member, the surrounding holding edge is placed around the frame in the peripheral direction, that is, the non-return flap member is, as it were, pulled over the frame. The holding edge is configured to clamp the non-return flap member circumferentially on the frame, so that it is ensured that the non-return flap member is reliably held on the frame. In this way, preferably no tool is required to mount this non-return flap member to the frame.

In order that the non-return flap member is better held on the frame, the holding edge may have detent elements and/or a detent lip provided thereon which engage(s) the frame. The detent lip is formed, for example, by an at least partly surrounding edge which is directed radially inward and can engage a corresponding element on the frame.

To improve the snap connection of the holding edge to the frame, the frame has, for example, a fin provided thereon which projects in the direction of the plane of the frame or of the non-return flap member and, in particular, is circumferential, and is engaged by the holding edge of the non-return flap member. The fin preferably protrudes from the frame in a ring shape, so that a detent lip provided on the holding edge and directed radially inward can engage the fin. This allows the non-return flap member to be mounted to the frame in a simple manner and without a tool.

Apart from the sealing of the recesses in the frame, it is just as important to seal the entire venting device in the opening of the vehicle. To this end, use is usually made of seals which are provided on the frame and rest against the opening of the vehicle to seal the frame against the vehicle. However, fitting the seals to the frame is very involved and has to be effected in a two-component injection molding process, for example. As an alternative, it is possible to use sealing foams, which however requires an additional operating step and makes a later disassembly of the venting device more difficult. To simplify the sealing of the venting device relative to the opening of the vehicle, the non-return flap member has a seal provided thereon which, in particular, is circumferential and may rest against the vehicle. The non-return flap member consists of a flexible material which can just as well be used as a sealing material. Therefore, both the frame and the non-return flap member can be produced in a single-component injection molding process, so that complicated two-component injection molding processes can be avoided.

To increase the contact of the cutouts, that is, the non-return flaps, with the support surfaces of the frame, the support surfaces are arranged at a non-zero angle in relation to the plane of the frame or of the non-return flap member. When the non-return flap member is placed on the frame with a surface contact and fixed in position thereon, the cutouts are pushed out of the plane of the non-return flap member, so that they are spring-pressed against the support surfaces. As a result, there is a preload as early as in the mounted condition, causing the cutouts to be pressed against the support surfaces.

To allow the non-return flap member to be fixed to the frame in an improved manner, above all in the case of large venting devices, the frame and the non-return flap member preferably have cooperating detent elements provided thereon which are spaced from the holding edge. These detent elements also allow the non-return flap member to be fixed in position on the frame in the center of the venting device, so that the non-return flap member cannot lift off from the frame. Use of detent elements allows the non-return flap member to be mounted without a tool in this embodiment as well.

The venting device can only function without trouble if the non-return flap member is mounted on the frame such that the cutouts can come to rest against the support surfaces on the frame. Particularly in the case of round venting devices, it should therefore be made sure that the non-return flap member is correctly oriented relative to the frame. To simplify the correct assembly, the frame and the non-return flap member therefore preferably have cooperating anti-rotation means provided thereon, which ensure, for one thing, that the non-return flap member can not rotate in relation to the frame while the vehicle is in operation. For another thing, the anti-rotation means also serve as a centering and mounting aid, so that the non-return flap member can only be mounted on the frame when it is oriented correctly.

The cutouts may be punched out or cut out of the non-return flap member, for example, which allows a simple production of the cutouts. More particularly, the cuts are preferably made in a U-shape, so that a rectangular cutout is obtained which can move out of the plane of the non-return flap member about an edge. But the shape of the cutouts can be adapted to that of the recesses in the frame as desired, as long as the cutouts are held at one edge thereof on the remaining non-return flap member.

Preferably, an at least partly surrounding water deflector is provided on the side of the non-return flap member facing away from the frame.

BRIEF DESCRIPTION OF THE DRAWINGS

Further advantages and features will be apparent from the description given below with reference to the accompanying drawings, in which:

FIGS. 1a to 1c show various views of the frame of a venting device according to the invention;

FIGS. 3a to 3c show various views of the frame of a venting device according to the invention with a frame as shown in FIGS. 1a to 1c and a non-return flap member as shown in FIGS. 2a to 2d;

FIG. 4 shows a detail view of a venting device as shown in FIGS. 3a to 3c, mounted in a vehicle.

DESCRIPTION

Figure 2A:
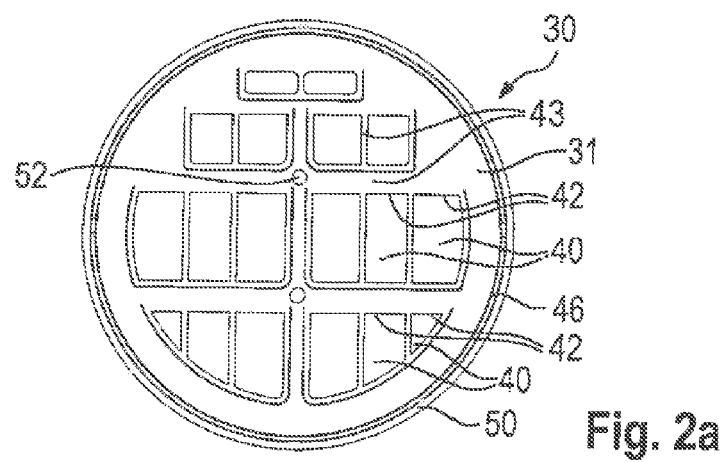
FIGS. 2a to 2d show various views of the non-return flap member of a venting device according to the invention.

FIGS. 1a to 1c show a frame 10 for a venting device 12 shown in FIGS. 3a to 3c. The frame 10 has a ring-shaped base body 14 which includes a plurality of webs 16 and a plurality of recesses 18 arranged between the webs 16.

As can be seen in FIG. 1b, detent elements 20 are provided radially on the outside of the base body 14 and can be used for fixing the frame 10 in place in an opening 22 of a vehicle 24 (see FIG. 4).

Figure 2B:
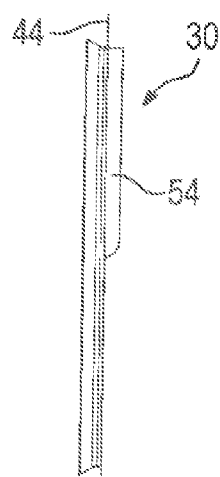
Figure 2C:
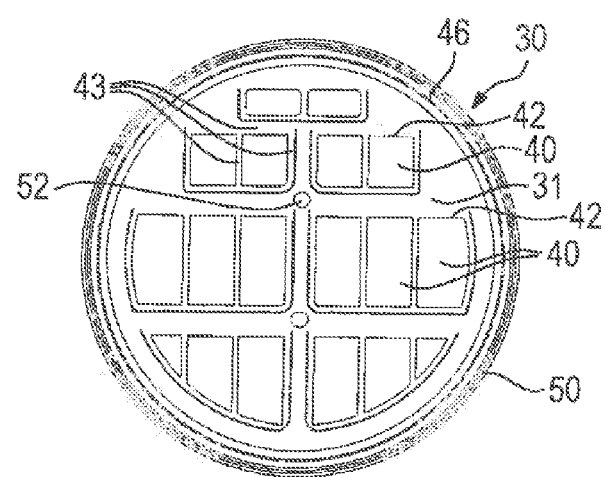
Figure 2D:
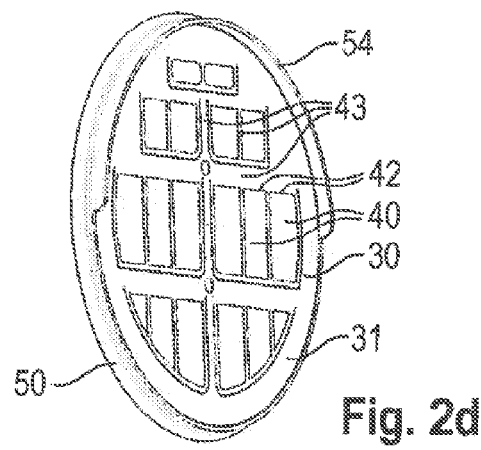

Also provided on the frame 10 are two detent elements 28 which project perpendicularly from the plane 26 of the frame 10 (see FIG. 1b) and to which a non-return flap member 30 (see FIGS. 2a to 2d) can be fixed, as will be discussed below. Further provided on the frame are a substantially T-shaped recess 32 which constitutes an anti-rotation means, and a circumferential fin 34 projecting in the radial direction.

As can be seen in FIG. 1b, the recesses 18 are each defined by a surrounding support surface 36 which is arranged at a non-zero angle 38 in relation to the plane 26. This angle is between 5° and 30°.

The frame 10 is made from a hard plastic component. "Hard" means that the frame has an inherent stiffness which, in view of the loads usually occurring in operation, will not lead to a deformation.

FIGS. 2a to 2d show a non-return flap member 30 which can be placed onto and fixed to the frame 10. The non-return flap member 30 is made from a flexible material, in particular from an elastically deformable plastic material.

The non-return flap member 30 is provided with a plurality of substantially rectangular cutouts 40 which are each connected in one piece with the non-return flap member via an edge 42. More particularly, the cutouts are formed by a U-shaped cut or by punching in a U-shape from the non-return flap member 30. That is, the cutouts 40 can each be moved out of the plane of the non-return flap member about the edge 42. Webs 43 are provided between the cutouts 40.

The non-return flap member 30 has a substantially flat base body 31 which has substantially the shape of the frame 10. The webs 43 are configured such that they can rest on the webs 16 of the frame 10. The cutouts 40 are each arranged over a respective recess 18 and rest at their borders against the support surfaces 36 of the recesses 18, the edges 42 and the webs 43 being positioned substantially in the plane 26 of the frame 10.

The non-return flap member 30 further includes an annularly shaped holding edge 46 which projects toward the frame 10 perpendicularly to the plane 44 of the non-return flap member 30. A detent lip 48 which is directed radially inwards is provided radially on the inside of the holding edge 46.

Further provided on the non-return flap member 30 is a circumferentially surrounding seal 50 which is formed by a further radially surrounding rim having a radius that is larger than the radius of the holding edge 46.

The non-return flap member 30 furthermore includes two apertures 52 for the detent elements 28 to engage therein, and a T-shaped projection which can engage in the recess 32.

The non-return flap member 30 is further provided with a partly surrounding water deflector 54 on its side facing away from the frame 10, that is, opposite to the holding edge 46, the water deflector being formed by a projecting edge.

For mounting the venting device 12, the non-return flap member 30 is placed on the frame 10 before the frame 10 is inserted into the opening 22 of a vehicle 24, the non-return flap member 30 extending over the entire frame 10. The T-shaped projection engages in the recess 32, and the detent elements 28 are introduced in the apertures 52. This defines the orientation of the non-return flap member 30 on the frame 10, so that the cutouts are disposed over the recesses 18 in an optimum position. This means that the recess 32 and the corresponding projection or the cooperating detent elements constitute an anti-rotation means preventing the non-return flap member 30 from rotating relative to the frame 10.

As can be further seen in FIGS. 3c and 4, the detent lip 48 of the holding edge 46 is placed around the fin 34, so that the detent lip 48 snaps on the fin and the non-return flap member 30 is circumferentially fixed in place on the frame 10. This allows the non-return flap member 30 to be mounted to the frame 10 in a simple and reliable manner and, in particular, with no tools being required.

As is apparent from FIG. 4, the seal 50 protrudes over the holding edge 46 perpendicularly to the plane 26 of the frame 10. In the installation position in the vehicle 24, this seal 50 rests against the surface of the vehicle 24 and seals the entire venting device 12 against the vehicle. Therefore, no additional sealing elements need to be provided on the frame 10. Any later sealing, for example using a sealing foam, is also not required.

As can be seen in FIGS. 3b and 3c, when the non-return flap member 30 is placed on, the cutouts 42 are pushed out of the plane 44 of the non-return flap member by the obliquely extending support surfaces 36. This gives the cutouts 40 a preload, which causes them to be pressed against the support surfaces 36. This preload ensures that the recesses are effectively sealed by the cutouts 40.

When there is an overpressure in the vehicle, the cutouts 40 can be pushed away from the support surfaces 36, so that an escape of the overpressure from the vehicle interior is possible. After the overpressure in the vehicle interior has dropped, the cutouts 40 are moved back by the preload to the closed position, in which they seal the recesses 18.

Since the non-return flap member 30 can be mounted to the frame 10 requiring no tools whatsoever, the venting device 12 can be assembled simply and quickly. In addition, since the sealing of the venting device on the vehicle is effected by means of the non-return flap member 30, it is not required to provide any additional sealing elements.

The shapes of the frame and of the non-return flap member can be selected in dependence on external circumstances. For example, other than the round shape as illustrated, elliptical shapes, polygonal shapes (rectangular, square, trapezoidal, etc.) or other shapes may also be used.

The invention claimed is:

1. A venting device configured to reduce excess pressure in a passenger compartment of a vehicle, the venting device comprising:
   a frame that is configured to be fixed in an opening of the vehicle, wherein the frame includes a plurality of frame webs and a plurality of support surfaces surrounding a plurality of recesses between the plurality of frame webs; and
   a single flap member fixed to the frame, wherein the flap member comprises:
      a plurality of individual flaps formed by cuts in the flap member and integrally connected to the flap member at a plurality of edges;
      a plurality of flap webs between the plurality of individual flaps, wherein the plurality of individual flaps are positioned over the plurality of recesses, wherein the flap member including the plurality of individual flaps is integrally formed as a single piece, wherein the flap member extends substantially over an entirety of the frame, wherein the plurality of individual flaps are in surface contact with the plurality of support surfaces in a closed position, and wherein the plurality of individual flaps are moved away from the plurality of support surfaces in an open position; and
      a seal that is configured to sealingly engage a portion of the vehicle.

2. The venting device of claim 1, wherein the flap member further comprises a surrounding holding edge that completely surrounds and engages around a periphery of the frame.

3. The venting device of claim 2, wherein the holding edge comprises one or both of detent elements or a detent lip that engage the frame and securely couple the flap member to the frame.

4. The venting device of claim 1, wherein the plurality of support surfaces are arranged at a non-zero angle in relation to the frame and the flap member.

5. The venting device of claim 1, wherein the frame and the flap member further comprise corresponding detent elements.

6. The venting device of claim 1, wherein the plurality of individual flaps are punched out or cut out of the flap member.

7. The venting device of claim 1, wherein each of the plurality of individual flaps is formed by a U-shaped cut.

8. The venting device of claim 1, wherein each of the plurality of individual flaps are moveable relative to the flap member about the plurality of edges.

9. The venting device of claim 1, wherein the flap member has a substantially flat base body that corresponds to a shape of the frame, wherein the plurality of flap webs overlay the plurality of frame webs.

10. The venting device of claim 1, wherein the frame further comprises two outwardly-extending detent elements, and wherein the flap member further comprises two apertures, wherein the apertures retain the detent elements to secure the flap member to the frame.

11. The venting device of claim 1, wherein the flap member further comprises a water deflector that extends away from the frame.

12. The venting device of claim 1, wherein the frame further comprises a T-shaped projection, wherein the flap member further comprises a recess that retains the T-shaped projection to prevent rotation of the flap member relative to the frame.

13. The venting device of claim 1, wherein the frame further comprises a peripheral fin, and wherein the flap member further comprises a detent lip that securely couples around the peripheral fin.

14. A venting device configured to reduce excess pressure in a passenger compartment of a vehicle, the venting device comprising:
   a frame that is configured to be fixed in an opening of the vehicle, wherein the frame includes a plurality of frame webs and a plurality of support surfaces surrounding a plurality of recesses between the plurality of frame webs; and
   a single flap member fixed to the frame, wherein the flap member comprises:
      a substantially flat base body that corresponds to a shape of the frame;
      a plurality of individual flaps formed by cuts in the flap member and integrally connected to the flap member at a plurality of edges, wherein each of the plurality of individual flaps are moveable relative to the flap member about the plurality of edges;
      a plurality of flap webs between the plurality of individual flaps, wherein the plurality of flap webs overlay the plurality of frame webs, wherein the plurality of individual flaps are positioned over the plurality of recesses, wherein the flap member including the plurality of individual flaps is integrally formed as a single piece, wherein the flap member extends substantially over an entirety of the frame, wherein the plurality of individual flaps are in surface contact with the plurality of support surfaces in a closed position, and wherein the plurality of individual flaps are moved away from the plurality of support surfaces in an open position; and a water deflector that extends away from the frame.

15. The venting device of claim 14, wherein the frame further comprises two outwardly-extending detent elements, and wherein the flap member further comprises two apertures, wherein the apertures retain the detent elements to secure the flap member to the frame.

16. The venting device of claim 14, wherein the frame further comprises a T-shaped projection, wherein the flap member further comprises a recess that retains the T-shaped projection to prevent rotation of the flap member relative to the frame.

17. The venting device of claim 14, wherein the frame further comprises a peripheral fin, and wherein the flap member further comprises a detent lip that securely couples around the peripheral fin.

18. The venting device of claim 14, wherein the frame further comprises a ring-shaped base body.

19. A venting device configured to reduce excess pressure in a passenger compartment of a vehicle, the venting device comprising:
    a frame that is configured to be fixed in an opening of the vehicle, wherein the frame includes a plurality of frame webs and a plurality of support surfaces surrounding a plurality of recesses between the plurality of frame webs; and
    a single flap member fixed to the frame, wherein the flap member comprises:
        a plurality of individual flaps formed by cuts in the flap member and integrally connected to the flap member at a plurality of edges;
        a plurality of flap webs between the plurality of individual flaps, wherein the plurality of individual flaps are positioned over the plurality of recesses, wherein the flap member including the plurality of individual flaps is integrally formed as a single piece, wherein the flap member extends substantially over an entirety of the frame, wherein the plurality of individual flaps are in surface contact with the plurality of support surfaces in a closed position, and wherein the plurality of individual flaps are moved away from the plurality of support surfaces in an open position; and
    a water deflector that extends away from the frame.

20. A venting device configured to reduce excess pressure in a passenger compartment of a vehicle, the venting device comprising:
    a frame that is configured to be fixed in an opening of the vehicle, wherein the frame includes a plurality of frame webs, a plurality of support surfaces surrounding a plurality of recesses between the plurality of frame webs, and a T-shaped projection; and
    a single flap member fixed to the frame, wherein the flap member comprises:
        a recess that retains the T-shaped projection to prevent rotation of the flap member relative to the frame;
        a plurality of individual flaps formed by cuts in the flap member and integrally connected to the flap member at a plurality of edges; and
        a plurality of flap webs between the plurality of individual flaps, wherein the plurality of individual flaps are positioned over the plurality of recesses, wherein the flap member including the plurality of individual flaps is integrally formed as a single piece, wherein the flap member extends substantially over an entirety of the frame, wherein the plurality of individual flaps are in surface contact with the plurality of support surfaces in a closed position, and wherein the plurality of individual flaps are moved away from the plurality of support surfaces in an open position.

* * * * *